(12) United States Patent
Barberis et al.

(10) Patent No.: US 7,763,132 B2
(45) Date of Patent: Jul. 27, 2010

(54) METHOD OF PRODUCING A ZIRCONIUM ALLOY SEMI-FINISHED PRODUCT FOR THE PRODUCTION OF ELONGATED PRODUCT AND USE THEREOF

(75) Inventors: Pierre Barberis, Ugine (FR); Noël Rizzi, Doussard (FR); Xavier Robbe, Albertville (FR)

(73) Assignee: Compagnie Europeenne du Zirconium-Cezus, Paris (FR)

( * ) Notice: Subject to any disclaimer, the term of this patent is extended or adjusted under 35 U.S.C. 154(b) by 434 days.

(21) Appl. No.: 10/541,774

(22) PCT Filed: Jan. 7, 2004

(86) PCT No.: PCT/FR2004/000019

§ 371 (c)(1),
(2), (4) Date: Jul. 7, 2005

(87) PCT Pub. No.: WO2004/072317

PCT Pub. Date: Aug. 26, 2004

(65) Prior Publication Data

US 2006/0090821 A1     May 4, 2006

(30) Foreign Application Priority Data

Jan. 13, 2003    (FR)    .................................. 03 00317

(51) Int. Cl.
*C22F 1/18*    (2006.01)

(52) U.S. Cl. ...................................... 148/672; 148/421
(58) Field of Classification Search ...................... None
See application file for complete search history.

(56) References Cited

U.S. PATENT DOCUMENTS

| 4,108,687 | A | * | 8/1978 | Armand et al. | ............. 148/557 |
| 4,992,240 | A | * | 2/1991 | Komatsu et al. | ............. 420/422 |
| 5,674,330 | A | * | 10/1997 | Charquet et al. | ............. 148/672 |
| 5,835,550 | A | * | 11/1998 | Van Swam et al. | ........... 376/409 |
| 5,838,753 | A | * | 11/1998 | Van Swam et al. | ........... 376/412 |
| 2004/0139781 | A1 | * | 7/2004 | Rozhdestvenskiy et al. | ... 72/377 |

FOREIGN PATENT DOCUMENTS

| EP | 0 085 552 |     | 8/1983 |
| EP | 0 085 553 | A2 * | 10/1983 |
| EP | 0 674 800 |     | 10/1995 |
| FR | 2 334 763 |     | 12/1975 |
| FR | 2 801 323 |     | 5/2001 |

\* cited by examiner

*Primary Examiner*—George Wyszomierski
*Assistant Examiner*—Mark L Shevin
(74) *Attorney, Agent, or Firm*—Davidson, Davidson & Kappel, LLC

(57) ABSTRACT

A large ingot is produced by casting the zirconium alloy, then the ingot is forged in two stages to obtain the semi-finished product wherein the first stage of forging the ingot is performed at a temperature at which the zirconium alloy is in a state comprising crystalline α and β phases.

10 Claims, 1 Drawing Sheet

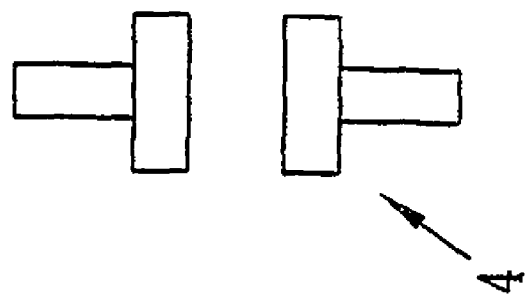
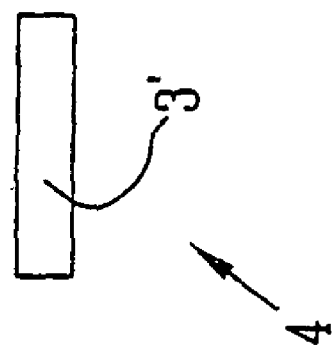
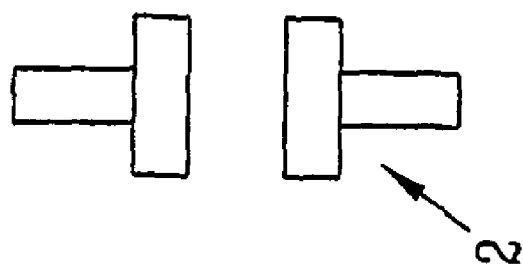
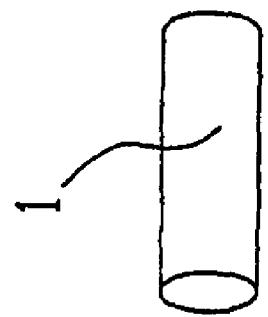

US 7,763,132 B2

METHOD OF PRODUCING A ZIRCONIUM ALLOY SEMI-FINISHED PRODUCT FOR THE PRODUCTION OF ELONGATED PRODUCT AND USE THEREOF

FIELD OF THE INVENTION

The present invention concerns a method of producing a zirconium alloy semi-finished product intended for the production of an elongated product used for the manufacture of fuel assembly elements.

BACKGROUND INFORMATION

Fuel assemblies in nuclear reactors cooled by light water, for example pressurized water reactors (PWR) and boiling water reactors (BWR), or fuel assemblies of CANDU reactors, contain elements comprising a zirconium alloy with the property of low neutron absorption in the heart of the nuclear reactor.

In the case of assemblies for PWR-type nuclear reactors, the jacket tubes for the fuel rods and the plates used for production of the spacer grids for the fuel assembly can be made of zirconium alloy, in particular zirconium alloy containing tin, iron, chromium and where applicable nickel, such as alloys Zircaloy 2 or Zircaloy 4. The same applies to the plugs which close the jacket rods at both ends.

Other alloys, such as the alloy known under the commercial name M5, essentially comprising zirconium and niobium are also used for the production of fuel assembly elements in the form of flat or elongated, solid or tubular products.

In general, the zirconium alloys used for the production of fuel assembly elements comprise at least 97% zirconium by weight, the remainder of the composition which represents at most 3% by weight, with the exception of impurities due to the production of the alloy, can comprise various elements and in particular iron, tin or niobium.

Zirconium alloys meeting these conditions in relation to their composition, depending on the temperature and the heat treatment to which they are subjected, can take one or the other of the two allotropic forms of zirconium i.e. the alpha phase, which is the phase of zirconium stable at low temperature with a compact hexagonal structure, or the beta phase, which is the phase stable at high temperature with a cubic structure.

In certain temperature ranges or at the end of certain treatments, zirconium alloys such as the technical alloys used for the production of fuel assembly rods defined above can have a mixed alpha+beta structure.

Tubular products of zirconium alloy are generally produced by extrusion of a rod which is itself obtained from an ingot by forming and where applicable machining operations.

Solid elongated products (bars) are generally produced by hot rolling then cold hammering of the semi-finished products obtained from the ingot.

Normally a large ingot is cast with a diameter for example between 400 and 700 mm, and generally between 600 and 660 mm. The ingot then undergoes the forging operations in a temperature range in which it can be in the $\alpha$, $\beta$ or $\alpha+\beta$ phase (EP-0.085.552 and U.S. Pat. No. 5,674,330). The ingot is $\beta$-phase forged at a temperature between 1000° C. and 1100° C., generally around 1050° C. in the case of Zircaloy 4, to obtain an intermediate product such as a bar or a product of square or octagonal section, of which the diameter of the transverse section (or the diameter of the circle circumscribing the transverse section) is between 250 mm and 400 mm. For example, in the case of an octagonal section, this can have a diagonal with length of the order of 350 mm which corresponds to the diameter of the circle circumscribed.

The intermediate product is then $\alpha$-phase forged at a temperature between 700° C. and 800° C., for example typically at 750° C., until a bar is obtained with a diameter of 100 mm to 250 mm (and typically a diameter of 205 mm).

Then either the bar resulting from the previous forging phase or a block comprising a part of a cut bar, or a rod produced from a block drilled in its axial direction, is hardened from the $\beta$ phase (typically from a temperature between 1000° C. and 1150° C.).

Finally, to obtain a tubular product a rod is extruded which can either be the hardened rod obtained in the preceding phase or a rod machined from a hardened bar obtained during the preceding phase of the production process.

To obtain an elongated solid product, hot rolling is performed on the hardened bar.

In all cases before the extrusion operation creating the final tubular product or the hot rolling operation creating a small diameter bar, a semi-finished product is produced in the form of a bar, a block or a rod by a production process comprising a first stage of $\beta$-phase forging of the starting ingot and a second stage of $\alpha$-phase forging of the intermediate product obtained at the end of the first $\beta$-phase forging stage.

The known transformation process which has just been described comprises a first $\beta$-phase forging stage at a high temperature between 1000° C. and 1100° C. After this first forging stage the intermediate product obtained is cooled at least to the temperature for $\alpha$-phase forging and generally to ambient temperature because the second $\alpha$-phase forging stage is not performed immediately after the first $\beta$-phase forging stage.

The very high temperature forging of the ingot is a costly and delicate process.

Also during heating of the ingot to bring it to a temperature of 1000° C. to 1100° C. before the first forging stage, the intermediate ingot can absorb hydrogen from contact with humid air or water, the hydrogen fixing in the material in the form of hydrides.

In general the presence of hydrides in the material in the form of coarse precipitates is harmful to the cold formability and corrosion resistance of the products.

SUMMARY

The objective of the invention is to propose a production process for a zirconium alloy semi-finished product containing by weight at least 97% zirconium and intended for the production of at least one elongated product, in which a large ingot is produced by casting the zirconium alloy, then a semi-finished product intended to be formed to obtain the elongated product is produced by two-stage forging of the large ingot, where this method simplifies and reduces the cost of production of the elongated product, and limits the presence of hydrides to low levels in the semi-finished product and hence in the elongated end product.

To this end the first stage of forging the large ingot is performed at a temperature at which the zirconium alloy is in a state comprising crystalline $\alpha$ and $\beta$ phases of the zirconium alloy.

According to particular features:
at the temperature of the first forging stage, the ingot comprises a volume proportion of zirconium alloy in the $\alpha$ phase between 10% and 90%, the rest of the zirconium alloy of the ingot being in the $\beta$ phase,
the first forging stage is performed at a temperature between 850° C. and 950° C.;

the first forging stage is performed at a temperature around 900° C.;

the first forging stage is performed at a temperature between 600° C. and 950° C.;

the second forging stage is performed at a temperature at which the zirconium alloy of an intermediate product obtained from the first stage of forging the ingot is in the α phase;

the second forging stage is performed at a temperature at which the zirconium alloy of an intermediate product obtained on completion of the first stage of forging the ingot is in a state comprising crystalline α and β phases of the zirconium alloy; and the zirconium alloy comprises at least 3% by weight in total of additional elements comprising at least one of the elements tin, iron, chromium, nickel, oxygen, niobium, vanadium and silicon, the remainder of the alloy being constituted by zirconium with the exception of the inevitable impurities.

The invention also relates to:

the use of the method for production of a semi-finished product such as a bar or rod intended for production of a tubular product for manufacture of a fuel assembly element such as a jacket tube or guide tube of a fuel assembly for a water-cooled nuclear reactor or a fuel assembly element for a CANDU reactor;

or the use of the method for production of a bar intended for production of a small diameter plug bar for the manufacture of plugs for closing the ends of the jacket tubes of the fuel assembly rods for the nuclear reactor.

In order to understand the invention, a production method will be described of a semi-finished product intended for production of tubular products according to the invention, by comparison with the method according to the prior art.

BRIEF DESCRIPTION OF THE DRAWINGS

FIG. 1 is a diagram showing in a simplified manner the various stages of the method of production of the semi-finished product.

DETAILED DESCRIPTION

FIG. 1 shows a cast ingot 1 which can be a large ingot, the diameter of which can be between 400 mm and 700 mm and the length between 2 m and 3 m, which is obtained by casting a zirconium alloy used for the production of tubular products for the manufacture of fuel assembly elements.

The zirconium alloy can be for example a Zircaloy 2 alloy comprising in weight from 1.2% to 1.7% tin, 0.07% to 0.20% iron, 0.05% to 0.15% chromium, 0.03% to 0.08% nickel, at most 120 ppm silicon and 150 ppm carbon, the remainder of the alloy being constituted by zirconium with the exception of the usual impurities.

The alloy for production of the elongated product can be also a Zircaloy 4 comprising in weight 1.2% to 1.7% tin, 0.18% to 0.24% iron, 0.07% to 0.13% chromium, at most 150 ppm carbon, the remainder of the alloy being constituted by zirconium and impurities.

The zirconium alloy used to make the elongated product can also be an alloy of the M5 type comprising essentially zirconium and niobium.

According to the invention the ingot is brought to a temperature at which the zirconium alloy is in the α+β phase, to perform the first stage of forging the ingot in the α+β phase.

The temperature for the α+β phase forging (first stage of the method) is selected so that the volume proportion of the α phase in the ingot alloy is between 10% and 90%, the remainder of the alloy being in the β phase.

Generally the first forging stage is performed at a temperature between 850° C. and 950° C. and for example typically at 900° C. in the case of Zircaloy 4. At this temperature the zirconium alloys such as Zircaloy are in the α+β phase. In the case of zirconium-niobium alloys such as alloy M5, the α+β phase extends over a temperature range substantially larger than in the case of the Zircaloy type alloys, this range being from 600° C. to 950° C.

The ingot is forged as in the case of the method according to conventional methods, where the forging was performed at high temperature (for example 1050° C.) until a bar is obtained or a product of square or octagonal section inscribed in a circle of diameter 250 mm to 400 mm, typically in a circle of diameter of 350 mm.

Substitution of α+β phase forging for β-phase forging at a higher temperature gives an intermediate product with characteristics similar to those of the usual intermediate product obtained by the first β-phase forging stage.

The lowering of the forging temperature, for example to 150° C., is reflected in substantial savings in implementation of the production process.

Also this forging can be performed using conventional tooling taking into account a slight adaptation of the forging process.

In the case of zirconium-niobium alloys such as M5, it is possible to perform the forging at a temperature substantially lower than 900° C., the α+β phase of the alloy extending from the temperature of 600° C. to 950° C.

In a first variant of the invention, the second stage of the forging process to obtain the semi-finished product from an intermediate product can be performed in the same manner as in the known process in conventional methods, i.e. performing a second forging in the α phase at a temperature between 700° C. and 800° C. to give a bar with a diameter between 100 mm and 250 mm.

In a second variant of the process it is possible to perform the second forging stage, to obtain a semi-finished product in the form of a bar, at the same temperature as the first forging stage i.e. on the product in the α+β phase.

The diagram shows schematically the forging installation allowing performance of the first forging stage 2 on the ingot 1 at a temperature at which the ingot 1 is in the α+β phase. After the first forging stage 2, an intermediate product 3' is obtained comprising a bar or a product of square or octagonal section which is subjected to a second forging stage 4 to obtain the semi-finished product 3 in the form of a rod or bar, from which the elongated end product can be obtained by extrusion or hot rolling.

The tooling used in the first α+β phase forging stage 2 and in the second forging stage 4 can be conventional tools used as part of a process of the conventional methods in which the first stage 2 is performed on the ingot 1 in the β phase and the second stage 4 on the intermediate product 3' in the α phase.

In the case of the invention, the second forging stage 2 can be performed at the same temperature as the first forging stage 2, the intermediate product 3' being in the α+β phase.

The second stage 4 can also be performed in the α phase as in the case of a process of conventional methods.

The intermediate product 3' obtained from the first forging stage in the α+β phase can be subjected to a cooling stage of any type.

The intermediate product 3' can be immediately brought to the temperature of the second forging stage i.e. a temperature at which the product is in the α phase or in the α+β phase.

In the case where the two forging stages are performed in the α+β phase, the product temperature can be maintained between the two forging stages.

Forging the ingot 1 in two stages allows production of a bar or rod with a diameter between 100 and 250 mm that constitutes the semi-finished product which is then subjected to the operation of extrusion or hot rolling to obtain a tubular part or a small diameter bar that can be used for production of elements for fuel assemblies for nuclear reactors.

By performing analyses on the semi-finished product 3 or on the elongated products obtained from the semi-finished product, it can be observed that the quantity of hydrides contained in the alloy obtained by the process according to the invention is substantially smaller than the quantity of hydrides contained in a product according to conventional methods.

Also the semi-finished product or elongated end products obtained from this semi-finished product have mechanical and structural characteristics substantially similar to those of products obtained by a process according to conventional methods.

In particular the corrosion resistance and formability of the tubular products produced from the semi-finished product according to the invention are substantially superior to those of the product obtained by the process according to the conventional methods.

One of the advantages of the method according to the invention is to simplify the process of production of the semi-finished product by limiting the forging temperature during the first forging stage and where applicable omitting any cooling after the first forging stage. This reduces the cost and duration of the implementation of the method.

In the case of the Zircaloy 2 and Zircaloy 4 alloys or any other zirconium alloy containing tin, the transition to the α+β phase of the alloy, to perform the first stage and where applicable the second stage of the method according to the invention, can lead to the formation of tin segregations. However, these segregations can be suppressed by subsequent processing within the context of production of the tubular end product from the semi-finished product. The same applies to the elements oxygen and nitrogen.

In the case where the process of the invention is applied to niobium alloys as indicated above, the transition between the α and α+β phases being close to 600° C., the forging temperature in the α+β phase can be substantially lower than 900° C. taking into account however the malleability properties of the alloy at the forging temperature.

Application of the process according to the invention to zirconium alloys other than Zircaloy or to niobium alloys can be considered. These alloys generally contain at most 3% in weight of additive elements comprising at least one of the additive elements tin, iron, chromium, nickel, oxygen, niobium, vanadium and silicon, the remainder of the alloy being constituted by zirconium and the inevitable impurities.

The invention applies in particular to the production of tubular products of zirconium alloy for the manufacture of fuel assembly elements such as jacket tubes containing fuel pellets or guide tubes for fuel assemblies.

The invention also applies to the production of plug bars for the manufacture of plugs closing the ends of the jacket tubes of fuel assembly rods.

To obtain the end products from the semi-finished product, it may be necessary to perform operations after the extrusion or hot rolling of the semi-finished product, such as pilger rolling, where heat treatments can be also performed between the forming operations.

The invention is not limited strictly to the embodiments described.

The temperature for forging in the α+β phase depends on the composition of the zirconium alloy. The forming operations can be performed using the normal air augmented for forming in the α phase or β phase of the process of the conventional methods or other arrangements and methods adapted to α+β phase forging in one or two stages to obtain the semi-finished product.

The invention applies generally to any technical zirconium alloy product defined by the composition limits given above.

The invention claimed is:

1. A method for providing a zirconium alloy semi-finished product containing by weight at least 97% zirconium, intended for the production of at least one elongated product, comprising:
    casting the zirconium alloy to produce an ingot with a diameter between 400 mm and 700 mm and a length between 2 m and 3 m;
    forging the ingot in a first stage to produce an intermediate product with a cross-section inscribed in a circle of diameter of between 250 mm and 400 mm wherein the first forging stage of the ingot is performed at a temperature at which the zirconium alloy is in a state comprising the crystalline α and β phases of the zirconium alloy;
    forging, in a second forging stage, said intermediate product into a semi-finished product in the form of a rod or bar with a cross-section inscribed in a circle of diameter of between 100 mm and 250 mm, wherein β quenching does not occur between said first and second forging stage; and
    extruding or hot rolling the forged ingot.

2. The method according to claim 1, wherein at the temperature of the first forging stage, the ingot contains a volume proportion of zirconium alloy in the α phase between 10% and 90%, a remainder of the zirconium alloy of the ingot being in the β phase.

3. The method according to claim 1, wherein the first forging stage is performed at a temperature between 850° C. and 950° C.

4. The method according to claim 3, wherein the first forging stage is performed at a temperature of approximately 900° C.

5. The method according to claim 1, wherein the first forging stage is performed at a temperature between 600° C. and 950° C.

6. The method according to claim 1, further comprising:
    performing the second forging stage at a temperature at which the zirconium alloy of an intermediate product obtained by the first forging stage of the ingot is in the α phase.

7. The method as claimed in 1, wherein a second forging stage is performed at a temperature at which the zirconium alloy of an intermediate product obtained at an end of the first forging stage of the ingot is in a state comprising crystalline α and β phases of zirconium alloy.

8. The method according to claim 1, wherein the zirconium alloy contains at most 3% by weight in total of additive elements comprising at least one of tin, iron, chromium, nickel, oxygen, niobium, vanadium and silicon, a remainder of the alloy being constituted by zirconium with an exception of the inevitable impurities.

9. The method according to claim 1 further comprising:
    producing a semi-finished product intended for the production of a tubular product for manufacture of a fuel assembly element for one of a fuel assembly for a water-cooled nuclear reactor and a fuel assembly element for a CANDU reactor.

10. The method according to claim 1 further comprising:
    producing a bar intended for production of a small diameter plug bar for manufacture of plugs closing ends of jacket tubes of fuel assembly rods for nuclear reactors.

\* \* \* \* \*